(12) United States Patent
Graham et al.

(10) Patent No.: US 11,263,194 B2
(45) Date of Patent: *Mar. 1, 2022

(54) FILE BLOCK ADDRESSING FOR BACKUPS

(71) Applicant: EMC IP Holding Company LLC, Hopkinton, MA (US)

(72) Inventors: Debra H. Graham, Seattle, WA (US); Matthew D. Buchman, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/506,748

(22) Filed: Jul. 9, 2019

(65) Prior Publication Data
US 2019/0332593 A1 Oct. 31, 2019

Related U.S. Application Data

(63) Continuation of application No. 15/401,981, filed on Jan. 9, 2017, now Pat. No. 10,353,621, which is a continuation of application No. 13/803,134, filed on Mar. 14, 2013, now Pat. No. 9,542,397.

(51) Int. Cl.
| | |
|---|---|
| *G06F 7/02* | (2006.01) |
| *G06F 16/00* | (2019.01) |
| *G06F 16/22* | (2019.01) |
| *G06F 3/06* | (2006.01) |
| *G06F 11/14* | (2006.01) |
| *G06F 16/27* | (2019.01) |
| *G06F 11/00* | (2006.01) |

(52) U.S. Cl.
CPC .......... *G06F 16/2282* (2019.01); *G06F 3/065* (2013.01); *G06F 3/067* (2013.01); *G06F 3/0619* (2013.01); *G06F 3/0643* (2013.01); *G06F 11/00* (2013.01); *G06F 11/14* (2013.01); *G06F 11/1458* (2013.01); *G06F 11/1469* (2013.01); *G06F 16/27* (2019.01)

(58) Field of Classification Search
CPC .... G06F 16/2282; G06F 16/27; G06F 3/0619; G06F 3/0643; G06F 3/065; G06F 3/067; G06F 11/00; G06F 11/14; G06F 11/1458; G06F 11/1469
See application file for complete search history.

(56) References Cited

U.S. PATENT DOCUMENTS

| | | | |
|---|---|---|---|
| 6,098,074 A | 8/2000 | Cannon et al. | |
| 6,549,992 B1 | 4/2003 | Armangau | |
| 7,330,997 B1 | 2/2008 | Odom | |
| 7,337,331 B2 | 2/2008 | Yoshida | |
| 7,822,726 B1 | 10/2010 | Cardin | |
| 8,195,612 B1 | 6/2012 | Nagarkar et al. | |

(Continued)

*Primary Examiner* — Bruce M Moser
(74) *Attorney, Agent, or Firm* — Workman Nydegger

(57) ABSTRACT

Systems and methods for backing up data and for restoring at least sub-sets of the backed up data or for restoring sub-sets of data from a single file. An offset map is generated when backing up data. The offset map identifies at least starting locations of files and data records in the backup. A request for specific data is accommodated by identified the start locations of the specific data and then extracting the requested data from the backup. The requested data can then be restored independently of the entire backup.

17 Claims, 4 Drawing Sheets

(56) References Cited

U.S. PATENT DOCUMENTS

| | | | |
|---|---|---|---|
| 8,200,637 B1 | 6/2012 | Stringham | |
| 8,903,777 B1 * | 12/2014 | Searls | G06F 11/1451 |
| | | | 707/665 |
| 9,183,208 B1 | 11/2015 | Jaiswal | |
| 2007/0071998 A1 | 3/2007 | Gupta | |
| 2008/0313385 A1 | 12/2008 | Vijayakumar | |
| 2009/0132616 A1 | 5/2009 | Winter | |
| 2012/0084523 A1 | 4/2012 | Littlefield | |
| 2012/0233417 A1 | 9/2012 | Kalach | |
| 2013/0086418 A1 | 4/2013 | Sakurai | |
| 2013/0339299 A1 * | 12/2013 | Muller | G06F 16/27 |
| | | | 707/640 |
| 2014/0201162 A1 | 7/2014 | Kumarasamy et al. | |
| 2017/0249220 A1 | 8/2017 | Kumarasamy | |

* cited by examiner

FILE BLOCK ADDRESSING FOR BACKUPS

BACKGROUND OF THE INVENTION

1. The Field of the Invention

Embodiments of the present invention relate to backing up data and/or restoring data. More particularly, embodiments of the invention relate to systems and methods for backing up data and/or to restoring portions of sub-sets of the backed up data.

2. The Relevant Technology

In computing systems today, there is a need to ensure that data is protected. Because data can become lost or corrupted for many reasons, the data can be protected by backing up the data on a regular basis. Backing up data not only protects the data from loss or corruption, backing up data also provides a way to view the data at different points in time.

When backing up data, the amount of data being backed up can vary widely. In many examples, applications use large databases or virtual hard disks. Because these types of data can be large, some backup systems backup data use streaming formats or other proprietary formats such as a sequential backup stream.

When a streaming format is used to backup data, the data is encapsulated into a series of records. One consequence of using the streaming format, however, is that the ability to locate specific data in the backup is much more difficult. This is due in part to the encapsulation of data in the sequential format that occurs during the backup operation.

When restoring data from a sequential backup stream, the process can require many hours, especially where the data set is large. While this cannot be avoided when restoring the entire data set, it is often only necessary to restore a small subset of the data. Unfortunately, because the location of specific data is difficult to identify in the sequential backup stream, the recovery of the small subset of the data requires excessive time and cost.

BRIEF DESCRIPTION OF THE DRAWINGS

In order to describe the manner in which the above-recited and other advantages and features of embodiments of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings in which.

DETAILED DESCRIPTION OF THE PREFERRED EMBODIMENTS

Figure 1:
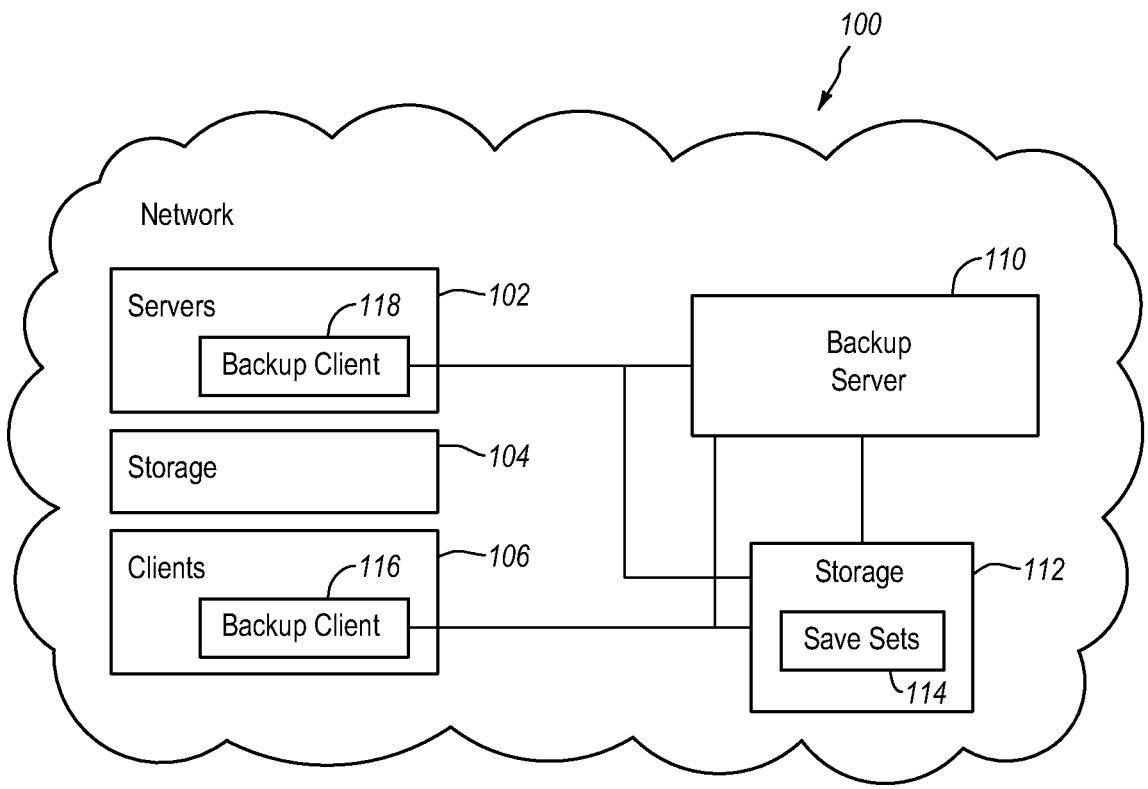
FIG. 1 illustrates an example view of a network that includes a backup server that cooperates with a backup client to backup data.

Embodiments of the invention relate to systems and methods for backing up and/or restoring data. Data can include, by way of example only, databases, documents, videos, images, spreadsheets, applications, or the like or any combination thereof. Embodiments further relate to systems and methods for restoring only portions of the backed up data. When backing up an application, the data backed up may include the data of the application (e.g., a database, a virtual machine, virtual hard disk, or the like) and/or the executable, and/or other components of the application such as libraries or the like.

Embodiments of the invention enable a portion (a sub-set of the backed up data) of a backup (e.g., a sequential backup stream) to be restored or retrieved without having to restore or retrieve the entire backup. In one example, a portion or sub-set of a single file can be restored. To restore data from a backup, an offset map is created that enables specific data (e.g., files, emails, mailbox, data blocks or records, or portions thereof, etc.) within a backup to be located. The ability to locate specific data in the backup enables the located data to be extracted or restored without having to restore the entire backup. Further, the ability to identify the start locations of specific subsets of individual files enables portions of individual files to be restored.

The ability to restore a portion of a backup can be used in a larger context. For example, in order to restore some types of data, it may be necessary to establish a framework in which the data can be restored. A database environment may need to be established before the requested data can be restored to the database. A virtual hard disk may be mounted before requested data is restored. A virtual machine may also be instantiated that includes the virtual hard disk. For example, the database or the virtual hard disk may be mounted sparsely. In other words, enough data is restored such that the database or the virtual hard disk appears to be complete. However, the database or virtual hard disk are sparsely populated and once sparsely mounted, the requested data can be restored. When portions of a specific file are requested, the database or the virtual hard disk may only actually contain the portions of the specific file. In this manner, specific portions of a file can be restored without restoring the entire backup and, in one instance, without fully mounting the database or the virtual hard disk. The virtual hard disk, which is a file in one example, can be restored as a sparse file.

As a result, a request for specific data may also automatically invoke a request for data needed to mount the database or mount the virtual hard disk. The restoration of the data necessary to mount the database or the virtual hard disk may occur in a similar manner to the restoration of other data that has been requested for restore.

In one example, a request for data required to mount, by way of example, a database or a virtual hard drive is intercepted and redirected to a backup client. The backup client then communicates or redirects the request to the backup server. The backup client may prepare the request for the backup server. Using an offset map or other index, the backup server can locate and return the requested data from the backups. The offset map includes enough information about the files or data in the backup such that a start location for specific data or for specific data blocks can be located. Once the start location is identified, the relevant data blocks or data records inside the backup can be extracted and returned to the requesting application as described in more detail below.

Embodiments of the invention, by way of example, can be used to restore portions of a file or portions of related files. In a backup that includes video files, for example, specific frames could be restored using the offset map. In a backup that includes emails, individual emails or a string of related emails could be restored. Embodiments of the invention generate an offset map that identifies starting locations of subsets of specific files. As a result, subsets of specific files can be restored. In addition, the restored files or the data blocks restored from the backup do not need to be contiguous. In other words, more than one starting location may be identified when restoring data identified in a restore request. If the data blocks are not contiguous or if more than one request is made, more than one starting location can be identified.

FIG. 1 illustrates an example of a network or computer system that includes a backup system configured to backup data and to restore the data or a portion of the data. As previously stated, the restoration of data is granular and can be applied to a single file, portions of a single file, or multiple files. FIG. 1 illustrates a network 100, which may be a local area network, a wide area network, or the like. The network 100 may be accessible over various networks including over the Internet.

The network 100 may include at least servers 102, storage 104 and/or clients 106. The servers 102 may be computing devices configured to operate as servers or that run applications including network-based applications. The servers 102 may include email servers, database servers, file servers, or the like. The servers 102 may also provide virtualization services and manage the operation of virtual machines. Some of the applications may be operating on virtual machines. Some of the servers 102 may be used to establish virtual file systems that may be used during the restoration of specific data. A database that includes restored data, for example, may be mounted in a virtual file system or in a virtual hard disk.

FIG. 1 further illustrates a backup client 118 that may be instantiated on one or more of the servers 102 and a backup client 116 that may operate on clients 106. The backup client 116 may be the same as the backup client 118. The backup client 118 can provide a user interface through which files or portions thereof can be restored. One or more instances of the backup client 118 or 116 may exist in the network 100. The backup client 118 may migrate to the server on which a restore is intended. In one example, the backup client 118 may operate on the device or server that is the destination of a restore operation.

The backup client 118 can initiate the backup of data and may stream data from an application to the backup server 110. The backup client 118 (or 116) reads the data and sends the encapsulated data to the backup server 110 in one example. The backup clients 116 and 118 can perform a backup operation and/or a restore operation through the backup server 110. Alternatively the backup clients 116 and 118 may be configured to interact directly with the storage 112.

The storage 104 may be integrated with the servers 102 or may be separate from the servers 102. The storage 104 can include various types of storage configurations such as storage area networks (SANs), network-attached storage (NAS) and direct-attached storage (DAS), disk arrays, or the like. The data or applications backed up in the network 100 may reside on the storage 104 or may reside with the servers 102 or the clients 106.

The clients 106 may include terminals that are capable of accessing the applications and data available in the network 100 using server side software and/or client side software. The clients 106 may have local storage that may also be backed up and/or restored.

FIG. 1 further illustrates a backup server 110 that is associated with storage 112. The storage 112 may be part of the storage 104 or may be separate from the storage 104. The storage 112 is configured to store backups of the applications/data in the network 100. The backups in the storage may be referred to as save sets 114. The backups may have different formats and may be generated in different ways. In one example, the backups or save sets 114 include sequential backup streams, which contain backup data for a group of one or more files or applications. The backup server 110 may maintain a comprehensive database and media index that enables data in the save sets 114 to be located. For example, the backup server 110 may maintain an index of backed up items and well as an index of backup volumes in the storage 112.

The backup clients 116 and 118 can cooperate with the backup server 110 to perform backup operations. The backup server 110 may also be involved in the restore operations as discussed in more detail below. For example, the backup clients may request a range of data blocks and the backup server 110 may retrieve the requested data blocks from the storage 112.

Figure 2:
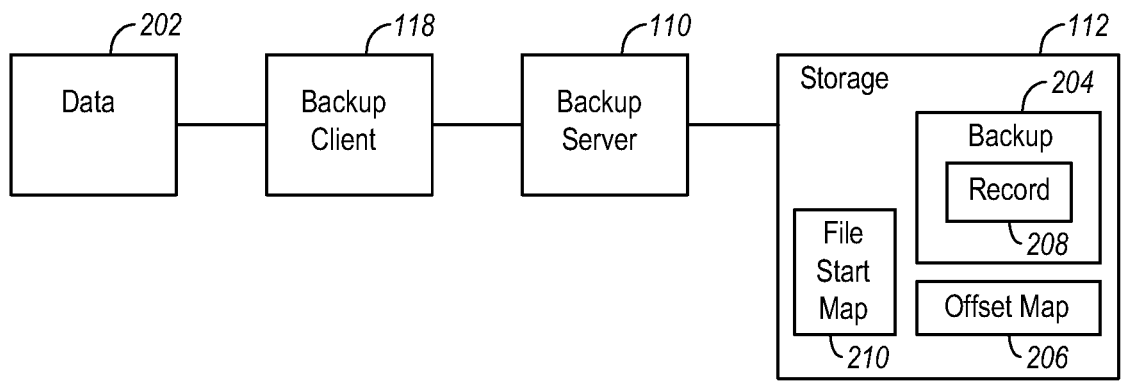
FIG. 2 illustrates an example of creating a backup such as a sequential backup stream.

FIG. 2 illustrates an example of a backup that is created and stored in the storage 112. More particularly, FIG. 2 illustrate an example of generating a backup 204 (e.g., a sequential backup stream) that includes or is associated with an offset map 206.

When generating or creating the backup 204 of the data 202, which may include files and/or an application, or the like, the backup client 118 reads the data 202 and generates a backup stream. The backup client 118 may create a record 208 that includes information about the data 202 or files being backed up. A record may be created for each file in the data 202. The information in the record 208 may include a filename, a relative location on a backup media, and/or a size. Other metadata may be included in the record 208. During the backup operation, the backup client 118 reads sequentially through the file or files being backed up and sends the data to the backup server 110 (or direct to the storage 112). The data 202 being backed up is encapsulated into records such as the record 208. The backup 204 can include a plurality of records and these records are stored as part of the backup 204, which can be an example of sequential backup stream. In one example, a sequential backup stream or the backup 204 contains backup data for a group of one or more files.

Advantageously, the backup client 118 alone or in cooperation with the backup server 110 can access and restore portions of files from the one or more files included in the backup 204. The backup 204 may be associated with a file start map 210 that identifies file start locations within the backup 204 or within the sequential backup stream. The file start locations can facilitate finding the location of files or of a block of files inside the backup 204 when the backup 204 is restored.

An offset map 206 is also included in or associated with the backup 204. The offset map 206 can be used to identify the start of a specific data block or of a range of data blocks in the backup 204 that correspond to specific portions of files. By accessing the backup 204 based on the offsets included in the offset map 206, portions of specifically requested files can be retrieved from the backup 204. More specifically, a range of data records can be retrieved based on the offset in the offset map and the data records can be assembled into the portions of files that were requested.

A sparse file may be used during the restore process, for example when restoring portions of a file. The retrieved data records may be placed in the sparse file. Using a sparse file enables only necessary data records to be retrieved or when called. In other words, it may not be necessary to retrieve the entire file when performing a restore operation.

As illustrated in FIG. 2, the generation or creation of the offset map 206 can occur at the time that the backup 204 is generated or created. Alternatively, the offset map 206 can be generated after the backup 204 has been completed. The offset map 206 may be generated as the data 202 is sequentially read by the backup client and provided to the backup server 110 for storage in the storage 112. When the data 202 or files included in the backup 204 are processed, all of the information needed to map a location (e.g., a byte location) of the data in the file being backed up to its location in the sequential backup stream is stored in the offset map 206. The offset map can be created by the backup client 118, the backup server 110, or both together.

As the backup client 118 or 116 moves sequentially through the data 202 or through a file, the backup client 110 creates encapsulated records of blocks of data. For each sequential backup stream data record, an offset map record is created. The offset map record may contain, by way of example a file byte offset, a sequential backup stream offset, and a size of the data being saved. The offset may be with respect to a particular file or with respect to the entire backup stream. The offset map record may also include other information that might be required to process the record at restore time. By way of example only, the offset map 206 can be maintained in memory as part of a linked list of offset map data records in one example. The collection of records included in the offset map 206 can be periodically written to disk to conserve memory, for example when backing up a large file. The offset map 206 can be inserted into a particular location of the backup 204. Alternatively, the offset map 206 can be stored separately from the backup 204 and associated with the backup 204.

Figure 3:
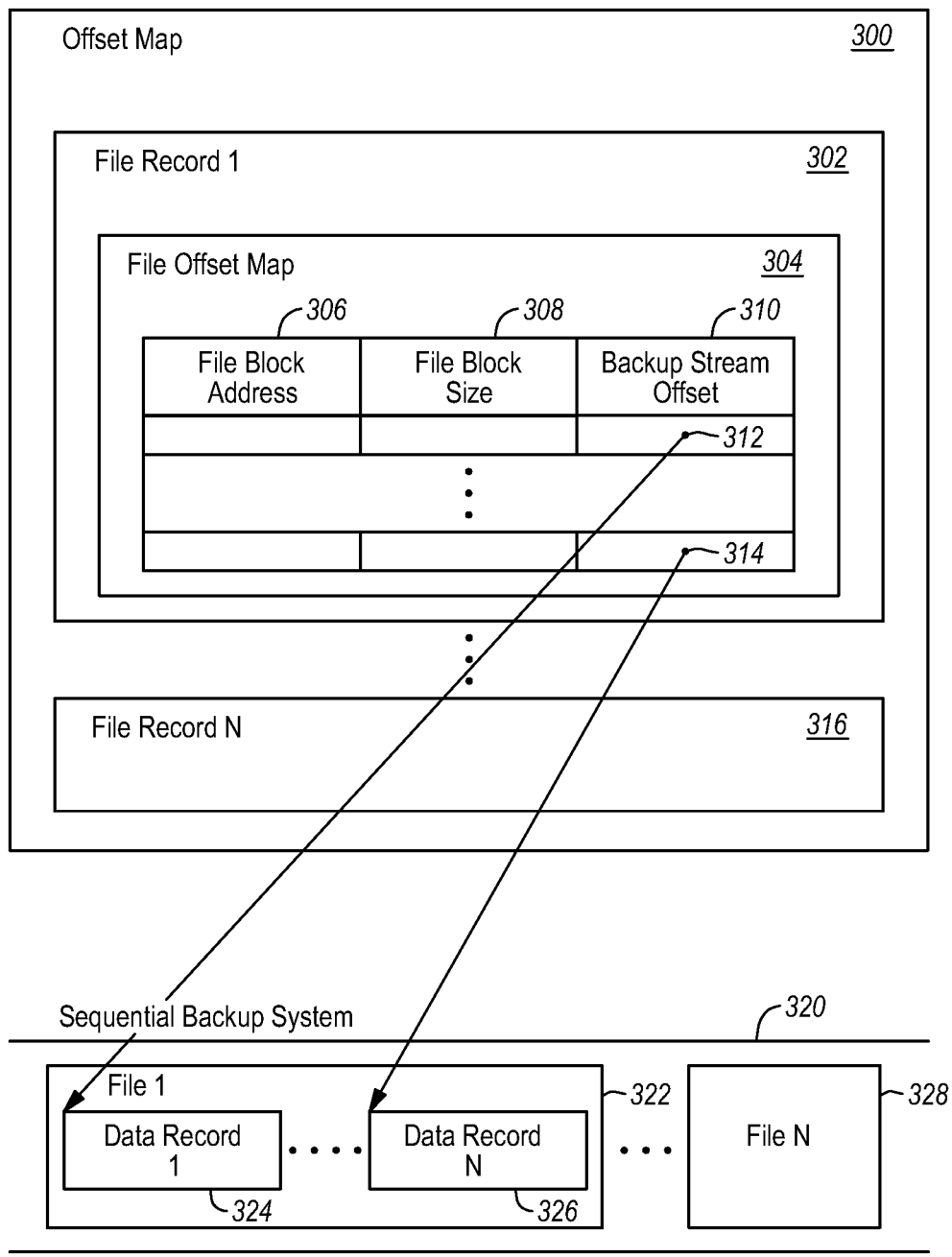
FIG. 3 illustrates an example of an offset map and a relationship between the offset map and files in a backup such as a sequential backup stream.

FIG. 3 illustrates an example of an offset map that is associated with a backup such as a sequential backup stream. One of skill in the art can appreciate, with the benefit of the present disclosure, that the offset map and information included therein may vary and may depend on the format of the sequential backup stream. Generally, the offset map enables certain locations, such as start locations, of files or of data records or of a range of files or data records to be identified. By knowing the size of the data being requested, which may be stored in the offset map, a section of the backup can be identified that includes the requested data. The data can then be extracted from the backup. By way of example, the actual data that has been requested can be extracted from the data section. The extraction of the requested data is formed in a manner consistent with the format of the backup and the way the backup is stored.

The offset map 300 is described with reference to an example of a format or structure of a sequential backup stream 320. The sequential backup stream 320 includes file 1 through file N, which are represented as file 322 and file 328 in FIG. 3 and which have been encapsulated or wrapped into the format of the stream 320. During the backup process, the file 322 is read from the source and is encapsulated into data records 1 through data record N, which are represented as data record 324 through data record 326. During the backup process, information about the file 322, such as filename, relative location in the sequential backup stream 320, and size is determined and may be incorporated into the offset map.

FIG. 3 also illustrates an example of an offset map 300 that is associated with the sequential backup stream 320. The offset map 300 may include one or more records (e.g., records 1-record N), which are illustrated as file record 302 through file record 316. Each file record includes a file offset map. The file record 302 includes a file offset map 304.

The file offset map 304 includes entries including, by way of example only, a file block address 306, a file block size 308, and a backup stream offset 312. Each entry in the file offset map 304 may correspond, in one example, to specific data records in a specific file in the sequential backup stream 320. Because certain information about the file 322 is known during the backup, some of this information can be incorporated into the offset map 300 and more specifically into the file offset map 304. The information included in the file offset map may include other information relevant to the sequential backup stream 320 or to data records included in the sequential backup stream 320.

For example, the file record 302 corresponds to the file 322 in the sequential backup stream 320 and the file record 316 corresponds to the file 328. In the offset map 300, the first entry in the file offset map 304 includes a backup stream offset 312 that can be used to identify a location of the data record 324 in the file 322 of the sequential backup stream 320. Similarly, a backup stream offset 314 can identify a location (e.g., a start location) of the data record 326 in the file 322. Because the start location of the data records 324 and 326 can be determined from the file offset map 304, the data records can be read from the sequential backup stream 320 without having to restore the entire sequential backup stream. As a result, subsets of the data can be restored, without having to restore the entire backup or without having to restore an entire file from backup.

The offset map 300 can be incorporated into the sequential backup stream 320 once the backup 320 is finished. For example, the offset map 300 can be included at a known location in the sequential backup stream 320. The offset map 300 could also be stored in a separate location and associated with the sequential backup stream 320.

Figure 4:
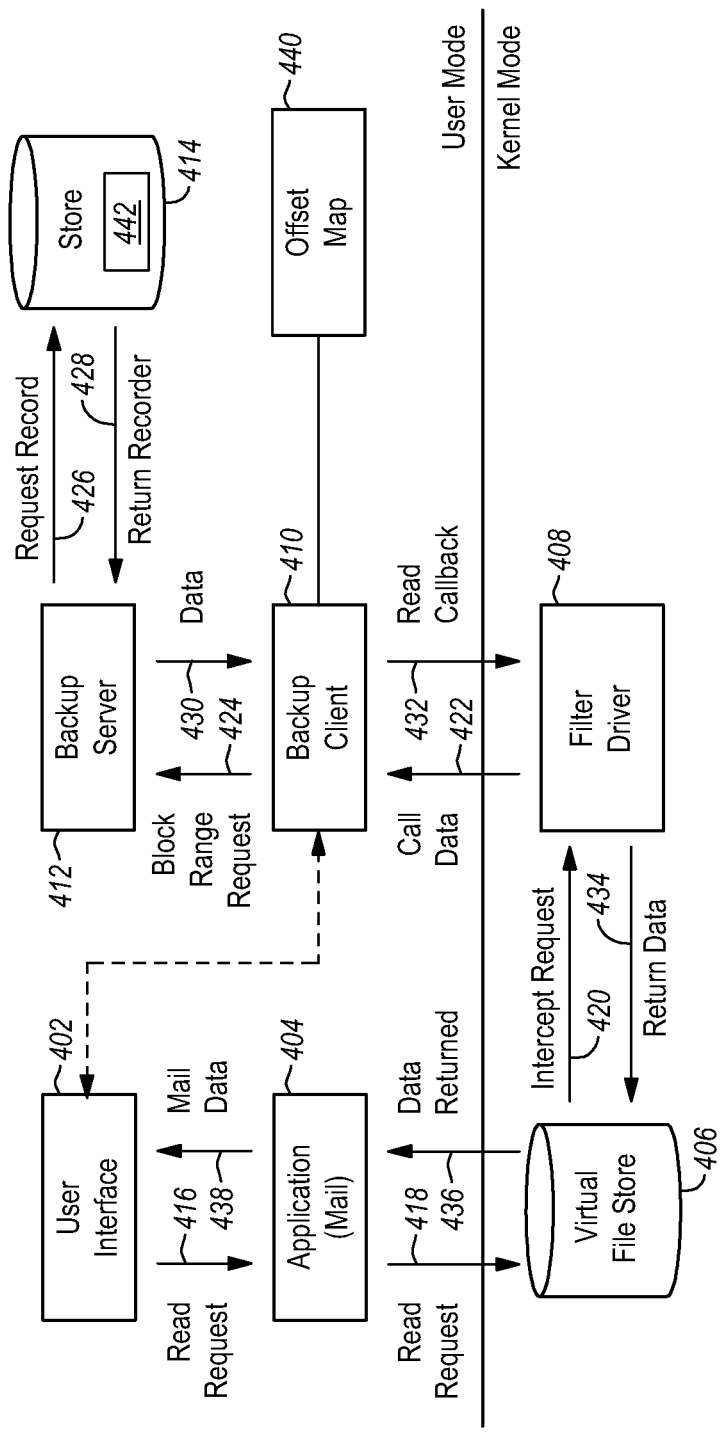
FIG. 4 illustrates an example of a system for restoring or retrieving a small subset of data from a backup such as a sequential backup stream.

FIG. 4 provides an example of an architecture or system that is capable of restoring portions of a backup (e.g., portions of data or files) using an offset map. FIG. 4 also illustrates a method for retrieving specific data from a backup. In this example, the data being restored is associated with an application 404 (e.g., a mail application such as Exchange®), which may be associated with a mail store or a mail database.

In the following example, the backup server 412 or backup client 410 may create a virtual file system 406 and a backup or save set from which data is to be restored may be identified. In order to restore specific data, it may be necessary to prepare the destination for the specific data. For example, the mail database and/or log files requested by the application may be restored or a framework in which the database and/or log files appear to be restored is generated. The database and log files restored to the virtual file system 406 may be a sparse copy of the database and log files requested by the mail application 404 for the chosen backup. The file system 406, however, may look like an ordinary file system to the mail application 404. In another example, a virtual hard disk may be mounted and prepared to receive the data. The virtual hard disk may also be a sparse file where only enough data is read so that the virtual hard disk appears to be complete.

To restore data, the application 404 mounts the database or the virtual hard disk. In mounting the database, the mail application 404 requests blocks of data from log files present on the virtual file system 406. These data requests are intercepted by a filter driver 408. The filter driver 408 sends these requests to a backup client 410. The backup client 410 applies or uses information in the offset map to locate or identify a starting location of the specific blocks of data requested by the mail application 404 in the backup. The backup client 410 then communicates a request to the backup server 412 for data sections within the backup that contains the required blocks of data. After receiving the requested sequential backup stream data sections from the backup server 412, which retrieved the data sections from the backup 442, the backup client 410 extracts the data sections and extracts the exact range of data blocks that correspond to the data requested by the application 404. The extracted data is then returned to the virtual file store 406 via the filter driver 408.

Once the destination is prepared (e.g., mounting the virtual hard disk, preparing a database, etc.), data can be restored. For example, the restoration of a particular user mailbox or of specific emails may be desired. A similar process is followed to retrieve blocks of data from the sequential backup stream to restore the identified mailbox or emails. The request for the particular user mailbox may initiate from a user interface 402 of the backup client 410. The user interface 402 may use plug ins to access the application 404 during the restore process.

The method of restoring a subset of data or of restoring specific data from a backup is also illustrated in FIG. 4. In restoring certain data from a selected backup, for example, a read request 416 is made to the application 404 via a user interface 402 of the backup client 410. In response to the read request 416, the application 404 makes a read request 418 to the virtual file store 406. As previously discussed, a database or other structure may have been mounted in the virtual file store 406 to accommodate the read request 418.

The read request 418 is intercepted 420 (intercept request) by the filter driver 408. The filter driver 408 then makes a call 422 (call data) to the backup client 410 for the requested data in the read request 418. The read request for the data that is provided to the backup client 410 may include certain information such as file name, and the like. The backup client 410 can use information in the read request 418 and the offset map 440 to identify start location(s) of the requested data in the backup 442 (which may be a sequential backup stream) in the store 414.

The backup client 410 then generates a block range request 424 that identifies the requested data blocks starting location(s) in the backup 442. The block range request 424 is provided to the backup server 412. The backup server 412 then requests 426 (request records) data sections of the backup 442 that correspond to the requested block range and the requested data section are returned 428 (return records) to the backup server 412.

The data sections are provided 430 to the backup client 410 and the backup client 410 extracts the data sections of the backup 442 to obtain the requested data records that correspond to the requested data. The read callback 432 from the backup client 410 to the filter driver 408 includes the requested data and the filter driver 408 returns 434 the data to the virtual file store 406.

The requested data is returned 436 to the application 404 and the mail data can then be accessed via the user interface 402 or restored such that the data can be accessed by the application 404. The foregoing example illustrates that a subset of backup 442 was restored. Restoration of the entire backup 442 was not required in this instance.

Figure 5:
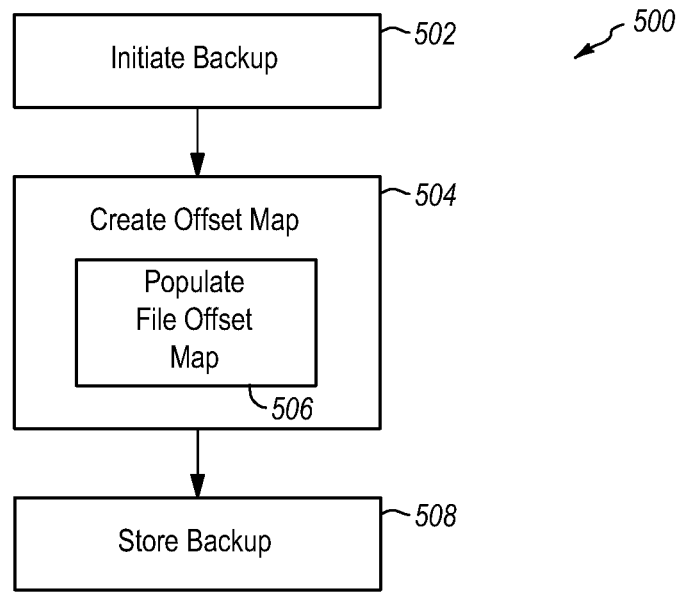
FIG. 5 illustrates a flow diagram for backup up data in a computing system.

FIG. 5 illustrates a method 500 for generating a backup such as a sequential backup stream from which subsets of data can be restored independently of the entire backup. In the method 500, a backup is initiated in block 500. This may occur in response to a call from a backup client or in response to a user request or per a backup schedule, or the like. The backup client typically drives the backup process.

In block 504, while performing the backup, an offset map is created or generated. The generation of the offset map may occur at substantially the same time as the generation of the backup or after the backup has been completed. When generating the offset map, file offset maps for the files being backed up are populated or created in the offset map. Each file record, which includes a file offset map for the file, may be associated with a corresponding file in the backup. The offset map may be a linked list of records, for example.

The information to place in the file offset maps may be determined from the files being backed up or from the structure of the sequential backup stream. File location, file block address, file block size, and the like are included in the file offset map for each file.

Offsets can be determined based on the sequential backup stream. As previously described, the sequential backup stream encapsulated the file as data records. The file offset map includes offsets to the start locations of the data records in the sequential backup stream. When a data section (a portion of the backup or a portion of a file) of the sequential backup stream is accessed, a data records (e.g., a range of data records or multiple data records) can be extracted. The data section as well as specific data records accessed can be identified using the offsets in the offset map.

In block 508, the completed backup is stored in an appropriate location. The offset map may be incorporated into the backup or stored in a separate location as previously described.

Figure 6:
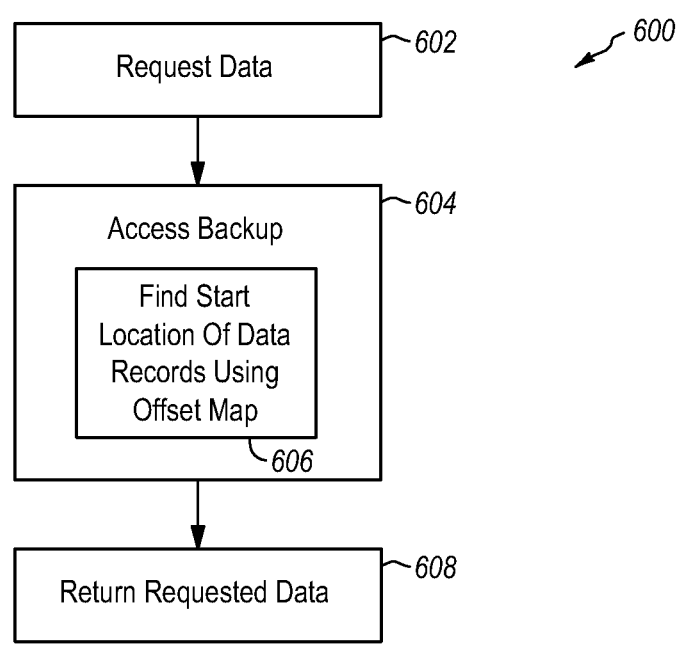
FIG. 6 illustrates a flow diagram for restoring or retrieving a small subset of data from a backup such as a sequential backup stream.

FIG. 6 illustrates an example method 600 for restoring a portion (e.g. a subset of data) of a backup. When restoring data, the data or subset of data to be restored is requested in block 602. The restore process typically originates via a user interface of a backup client. The subset of data may be a document, an email, a mailbox, a directory, a database table, or other data or portion thereof. In some instances, some preparation may occur prior to restoring the requested data. For example, an application's database may be mounted in a sparse manner in order to enable the application to interact with the database to make the request.

The request for data is provided to a backup server by the backup client and the backup stored by the backup server is accessed in block 604. For example, the backup client may use the offset map to identify the range of data records to be retrieved. To access the backup, the information in the offset map is applied to the request in order to identify a starting location of the range of data records that correspond to the requested files or data. This may include, in block 606, identifying a start location of the data using the offset map, identifying the appropriate backup to access, or the like.

In block 608, after the data is extracted from the backup based on the starting locations identified from the offset map, the requested data is returned in block 608. This can include storing the requested data in the database for the application, which database may be virtualized. This enables the application to interact with the restored data in a native manner and enables the restored data to be viewed within the context and operation of the native application. The application can be a mail application, a database application, a file server, or other server or application or the like or any combination thereof.

The embodiments described herein may include the use of a special purpose or general-purpose computer including various computer hardware or software modules, as discussed in greater detail below. The servers such as the backup server, the backup file server and other applications may include computing devices or special purpose computing devices.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Embodiments of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating a backup of data stored in a computing system, the method comprising:
  reading the data stored in storage of the computing system, wherein the data includes files;
  generating a backup stream that includes the data by encapsulating the files into the backup stream, wherein each of the files is comprised of data records;
  creating an offset map for the backup stream, wherein the offset map includes a record for each file included in the backup stream, wherein each record is associated with the data records of the corresponding file, wherein each record is associated with a file name, a size, and a relative location in the backup stream,
  creating, for each record, a file offset map, wherein the file offset map identifies an address, a size and a stream offset for each of the data records of the file corresponding to the record, wherein the offset map identifies starting locations of the records associated with the files in the backup stream;
  storing the offset map in association with the backup.

2. The method of claim 1, wherein the backup stream is a sequential backup stream created by sequentially reading through the files being backed up.

3. The method of claim 1, wherein each of the file offset maps further identifies start locations of specific data blocks or ranges of data blocks that correspond to the data records.

4. The method of claim 1, further comprising generating the offset map while the backup stream is being generated.

5. The method of claim 1, further comprising generating the offset map after the backup is completed.

6. The method of claim 1, wherein the offset map includes one or more of a file byte offset, a sequential backup stream offset, and a size of each record.

7. The method of claim 1, wherein each of the offsets for the records are set with respect to a corresponding file or with respect to the entire backup stream.

8. The method of claim 1, further comprising restoring the backup stream or restoring only a portion of the backup stream.

9. A method for generating a backup of data stored in a computing system, the method comprising:
  reading the data stored in storage of the computing system, wherein the data includes files;
  generating a sequential backup stream that includes the data by sequentially reading the files and encapsulating the files into the sequential backup stream, wherein each of the files is comprised of data records;
  creating an offset map that includes a record for each of the files included in the backup stream, wherein each record is associated with a file name, a size, and a relative location in the backup stream;
  creating a file offset map for each of the files, wherein the file offset map includes an address, a size and a stream offset for each of the data records associated with the corresponding file;
  and
  storing the offset map in association with the backup.

10. The method of claim 9, wherein the file offset map further identifies start locations of each of the files.

11. The method of claim 9, wherein each data record includes one or more blocks.

12. The method of claim 9, further comprising generating the offset map while the backup stream is being generated.

13. The method of claim 9, further comprising generating the offset map after the backup is completed.

14. The method of claim 9, further comprising restoring the backup stream.

15. The method of claim 9, further comprising restoring only a portion of the backup stream.

16. A non-transitory computer readable medium comprising computer executable instructions that, when executed by a processor, are configured to perform a method for generating a backup of data stored in a computing system, the method comprising:
- reading the data stored in storage of the computing system, wherein the data includes files;
- generating a sequential backup stream that includes the data by sequentially reading the files and encapsulating the files into the sequential backup stream, wherein each of the files is comprised of data records;
- creating an offset map that includes a record for each of the files included in the backup stream, wherein each record is associated with a file name, a size, and a relative location in the backup stream;
- creating a file offset map for each of the files, wherein the file offset map includes an address, a size and a stream offset for each of the data records associated with the corresponding file;

and storing the offset map in association with the backup.

17. The method of claim 16, wherein each data record includes one or more blocks.

\* \* \* \* \*